United States Patent

[11] 3,559,930

[72] Inventor Archibald B. Sellards
6928 E. Coronado Road, Scottsdale, Ariz. 85257

[21] Appl. No. 786,812
[22] Filed Dec. 9, 1968
[45] Patented Feb. 2, 1971

[54] DISTRIBUTION OF PARTICULATE MATERIAL
2 Claims, 12 Drawing Figs.

[52] U.S. Cl. .......... 244/136, 239/171
[51] Int. Cl. .......... B64d 1/16
[50] Field of Search .......... 244/136; 239/171; 169/2; 222/193

[56] References Cited

UNITED STATES PATENTS

| | | | |
|---|---|---|---|
| 2,052,626 | 9/1936 | Houghton, Jr. .......... | 244/136(X) |
| 3,310,205 | 3/1967 | Meyer .......... | 222/193 |
| 3,381,922 | 5/1968 | Laing .......... | 244/136 |

*Primary Examiner*—George E. A. Halvosa
*Assistant Examiner*—James E. Pittenger
*Attorney*—Drummond, Cahill & Phillips

ABSTRACT: An improved particulate material handling and application system for use in combination with an aircraft including a material hopper carried by the fuselage, ducts for distributing the material extending longitudinally of the airfoils and positive displacement transfer mechanism for delivering the particulate material from the hopper to the distribution duct system. Means are provided for removing remnant or excess particulate material from the outboard ends of the distribution ducts.

INVENTOR.
ARCHIBALD B. SELLARDS
BY
Drummond & Cahill
ATTORNEYS

INVENTOR.
ARCHIBALD B. SELLARDS
BY Drummond & Cahill
ATTORNEYS

INVENTOR.
ARCHIBALD B. SELLARDS
BY
Drummond & Cahill
ATTORNEYS

FIG. 11
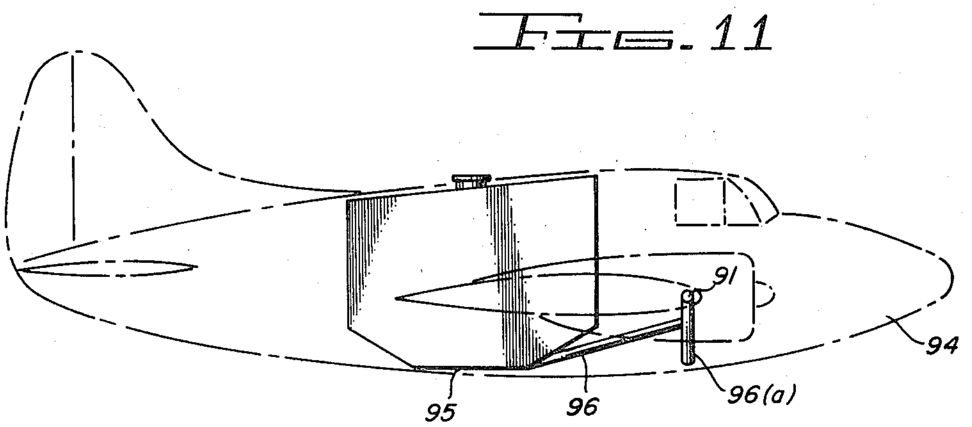
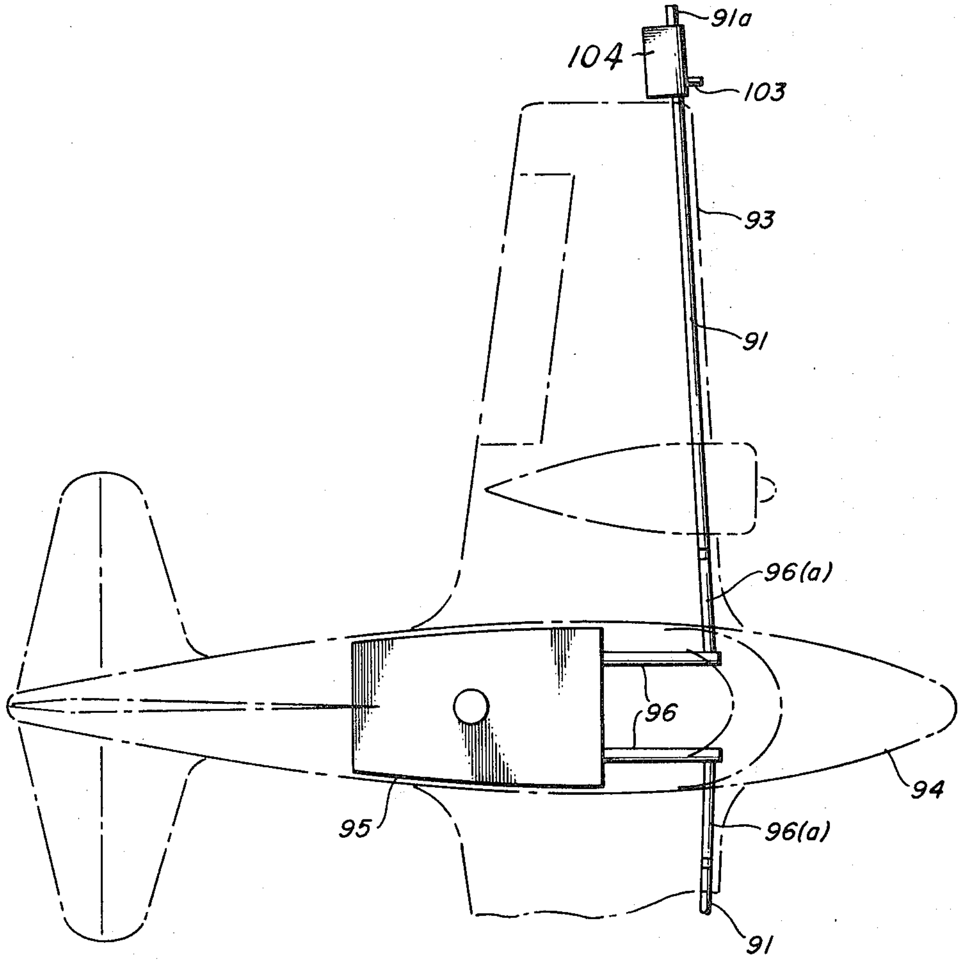
FIG. 12
INVENTOR.
ARCHIBALD B. SELLARDS
BY
Drummond & Cahill
ATTORNEYS

DISTRIBUTION OF PARTICULATE MATERIAL

The present invention is concerned with the distribution of particulate materials of various types by means of aircraft, and to a structure embodying an aircraft utilizable for such distribution.

Many types of particulate materials are distributed from the air, and the problems attendant upon such distribution are manifold. Types of materials distributed from the air include various kinds of insecticides absorbed on a carrier such as of diatomaceous earth, and the carrier mixed with a diluent such as powdered or very finely divided clay. The application of such materials is usually referred to as dusting, and the common practice is to utilize a relatively small plane in which a gas, usually air, is delivered under pressure through a venturi tube, and the dust entrained in such gas at the venturi tube to deliver an aspirated cloud of dust at the rear of the plane as it moves over and along rows of growing crops or the like. Among the problems associated with this particular method is that the area covered is usually small, and repeated passes over a field are necessary with attendant problems, all of which are known to those skilled in the art. Another problem when an insecticidal dust is applied in this manner is concerned with drifting, as a result of which the applied dust, or the lighter fractions of it, will tend to become suspended in the air and move with the wind to adjacent fields where the application is not desired, and where even the application may be harmful. Sometimes weed killers and defoliating substances are also applied in this manner, and the results may be very costly because of damage caused in adjacent fields. Moreover, to avoid drifting, it is almost always necessary to fly very low, and this contributes to the problems of safety as well as the problems of application to a wide area. It is a common practice also to apply insecticides, seed, or even fertilizers to vast areas of forest land or open range land to encourage growth of feed plants for animals. In western grazing lands where rainfall is below average, semicommercial and experimental seedings are continuously applied to improve the grazing land available. As part of such programs, it is not uncommon to experiment with chemicals designed to kill off the existing vegetation, particularly vegetation representing nonindigenous transplants which have gotten out of hand. In any case, there has long been need for a fully satisfactory method of and equipment for applying dust and other particulate materials over vast areas and in such a way as to avoid problems heretofore encountered.

Various systems have been proposed for distributing dust or other particulate materials from aircraft. However, such systems have not been entirely satisfactory as the capacity of the distribution system was dependent upon the airspeed of the aircraft. For example, such systems have been powered by auxiliary propellers, the speed of which is dependent upon the airspeed of the aircraft, or by means of venturi or other entraining apparatus which, again, are dependent upon the airspeed of the aircraft for operation and control of distribution rate.

Accordingly, it would be highly advantageous to provide a system for aerial distribution of particulate material which is not dependent upon external means such as auxiliary propellers, venturi or other entraining devices to discharge and regulate the quantity of material being distributed.

Also, prior art devices in which the particulate material is carried in the wings or in portions of the fuselage remote from the center of gravity of the aircraft are undesirable in that the handling characteristics of the aircraft are changed during flight as the load of particulate material is distributed. Accordingly, it would be highly desirable to provide an aircraft particulate material distributing system which avoids this problem.

Finally, certain prior art distribution systems for aircraft and other vehicles commonly employ material-handling apparatus the capacity of which cannot be accurately controlled as the system does not involve the positive displacement of a given volume of the particulate material but, rather, merely employs material-handling techniques which are unsuited to accurately meter the material transfer rate.

Accordingly, a principal object of the present invention is to provide improved means for applying particulate material from the air.

Another object is the provision of an improved applicator of the type identified which may be adjusted to apply substantially any type of particulate material, as contrasted with devices of the prior art which were more specialized in their capacities.

Still another object is the provision of improved applicating means of the character identified which may be applied to already-existing aircraft, or which may be built into special aircraft if desired.

Yet another object of the invention is the provision of improved apparatus for aerially applying particulate materials in which the discharge rate of the apparatus is substantially independent of the speed of the aircraft.

Another object of the invention is to provide a system of the type identified in which the discharge rate can be accurately controlled and varied over wide ranges to allow for handling a wide variety of particulate materials and to enable the application of such materials at widely varying application rates.

These and other, further and more specific objects and advantages of the invention will become apparent from the following detailed description taken in conjunction with the drawings, wherein:

FIGS. 11 and 12 are, respectively, elevation and plan views of the aircraft of FIG. 8 showing the location of the assembly of FIG. 9 within the existing aircraft structure which is indicated by dashed lines.

Figure 1:
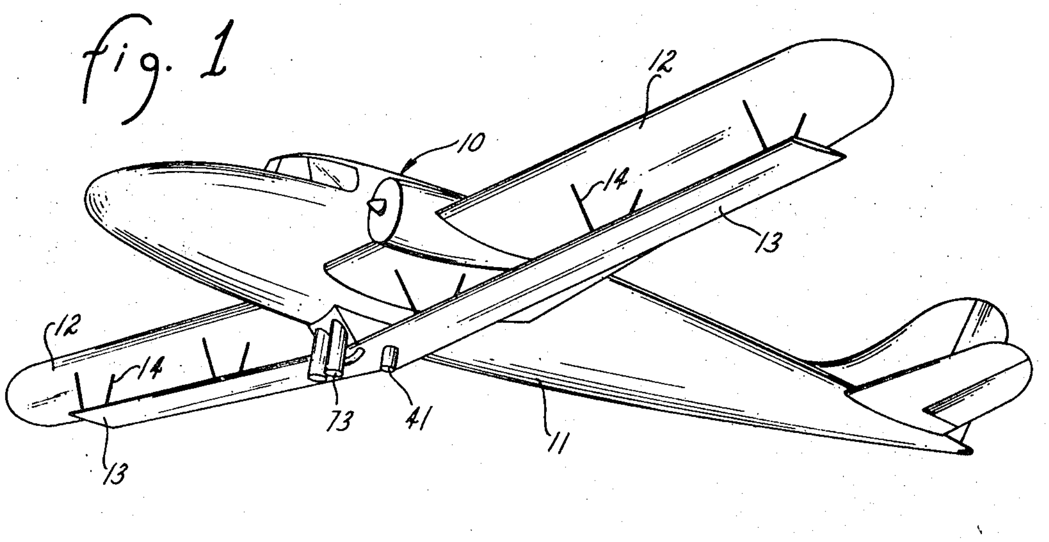
FIG. 1 is a perspective view showing an embodiment of the present invention as incorporated with a standard type of aircraft already in existence which is particularly useful when the wing structure of the existing aircraft will not accommodate internally disposed distribution apparatus.
Figure 2:
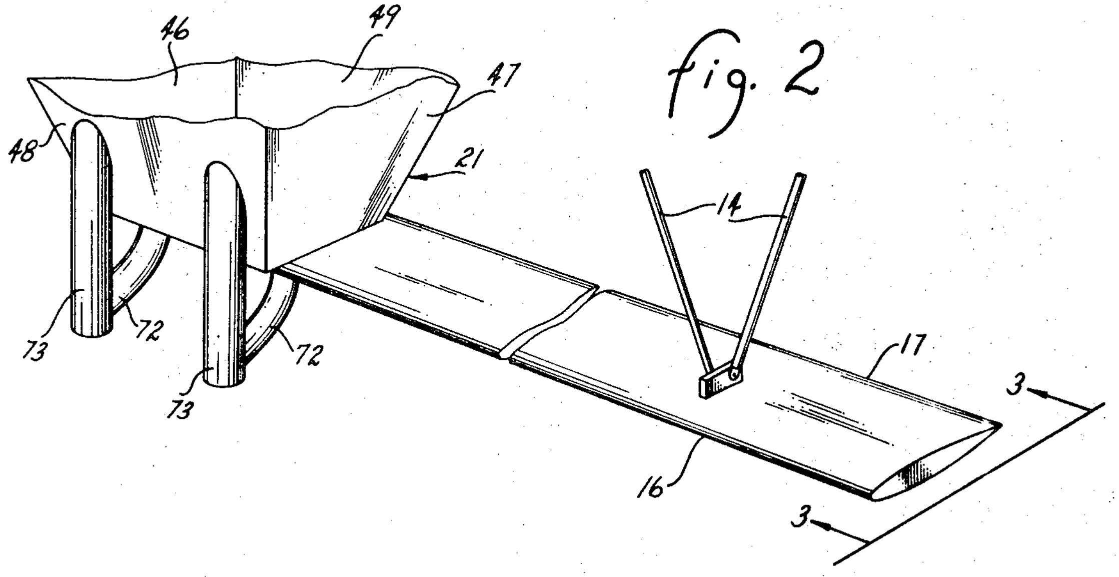
FIG. 2 is a fragmentary enlarged perspective view showing a part of the applicating mechanism of FIG. 1 separated from the aircraft proper.
Figure 3:
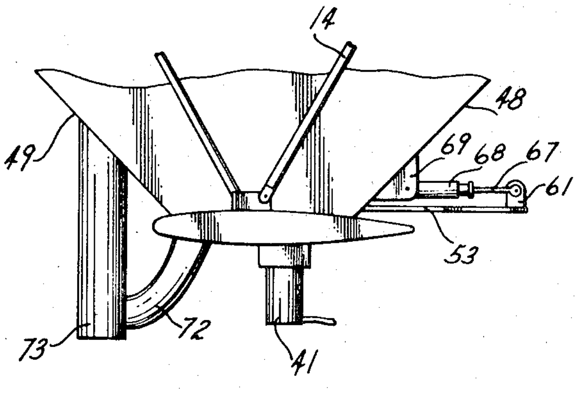
FIG. 3 is a fragmentary view showing a hopper associated with the airplane, a special airfoil, and other parts such as will be seen by looking along the line 3–3 of FIG. 2.
Figure 4:
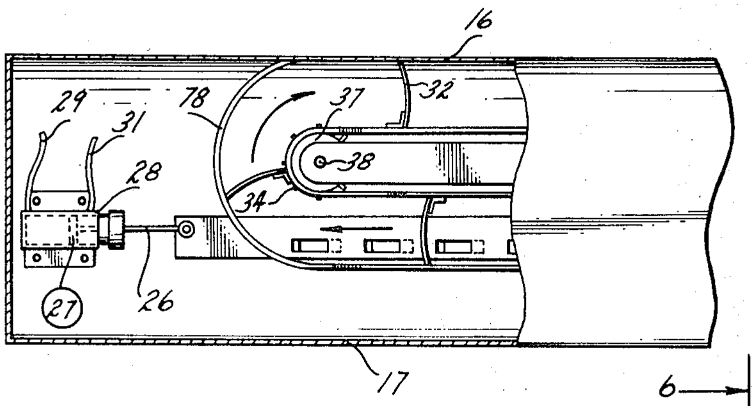
FIG. 4 is a fragmentary plan view showing a part of the special airfoil carrying a part of the distribution equipment, the airfoil being partly broken away at its outer end to show details of construction and operation.

Briefly, in order to achieve the objects and advantages of my invention, I provide an apparatus for aerially applying particulate materials which is used in combination with an aircraft having a load-carrying fuselage and laterally extending airfoils. The improved material-handling system includes a hopper for particulate material which is carried by the fuselage, distribution ducts which extend longitudinally of the airfoils and each of which has a plurality of distribution openings. A transfer duct connects the hopper with each of the distribution ducts and positive displacement delivery means for the particulate material, having a capacity independent of the air speed of the aircraft, are operatively disposed within the transfer and distribution ducts. Means are provided at the outboard ends of the distribution ducts for removing remnant particulate material which is not discharged through the distribution openings as the particulate material is passed through the distribution ducts. In a preferred embodiment of the invention, the storage hopper carried by the fuselage is located substantially at the center of gravity of the aircraft to avoid gross changes in aircraft handling characteristics as the load is progressively discharged. In this embodiment, the distribution ducts extend longitudinally within the lifting airfoils of the aircraft and the particulate material is moved through the transfer duct into the distribution ducts by means of variable capacity positive displacement augers operating within the ducts. The particulate material carried by the augers which is not discharged through the distribution openings is discharged through the open end of the distribution duct. This open end is swept clean of remnant particulate material by air forced into the end of the distribution ducts by means of a petot tube positioned proximate the ends of the ducts.

In another embodiment of the invention, the distribution ducts are shaped in the form of an airfoil which is suspended beneath the lifting airfoil of the aircraft, and means are provided for returning the excess particulate material from the outboard end of the distribution airfoil to the hopper.

Referring now to the drawings, the last-mentioned embodiment of the invention is depicted in FIGS. 1—7 in which a conventional type of airplane, indicated generally by the reference character 10, may be modified to transport and distribute a relatively very large amount of particulate material over a very large area, it being understood, of course, that the particular type and size of airplane and distribution capacity being determined in part at least by conditions encountered. In the present instance, the airplane used is a multiengine type with a fuselage 11 and wings 12, the engines being supported in nacelles in the two wings. As shown, the airplane is of the midwing type, but it should be understood that any conventional design of airplane can, as a rule, be used with substantially equal facility.

Particulate material is distributed from a pair of distribution airfoils 13 suspended from and secured to the wings 12 by a series of struts 14. Since the present invention is not concerned with the airplane as such nor the specific manner of supporting and suspending the distributing airfoils 13, details of construction are not provided.

The distribution airfoils 13 are, in effect, mirror images of each other and for convenience will be described as if they are identical except insofar as the text indicates a different relationship. The distribution airfoils 13 are preferably substantially neutral aerodynamically; that is to say, they provide neither lift nor control of the airplane and are designed to produce a minimum of drag, so that for all practical purposes, when the airplane is in level flight, the distribution airfoils will not influence the movement of the aircraft in any substantial way.

As FIGS. 4 through 7 particularly show, the distribution airfoils 13 are hollow and each has an entering edge 16 and a trailing edge 17. Spaced from the trailing edge 17 is a baffle 18 running longitudinally of each airfoil, but each baffle communicating with and being integral with an arcuate portion 19, the two arcuate portions 19 being in back-to-back relation and defining the center point between the two distribution airfoils 13. A hopper 21 has its bottom surface approximately coextensive with the top surface of the airfoils 13 as will be explained, such hopper extending upwardly through the bottom portion of the fuselage and being so constructed and arranged at the top that the particulate material to be distributed may be introduced into the hopper from inside the fuselage of the airplane. This construction may be conventional in any desired manner, but preferably the arrangement is such that packages, suitably bagged, of the particulate material may be carried as cargo in the fuselage, and introduced as required into the hopper while the airplane is in flight.

Figures 5, 6:
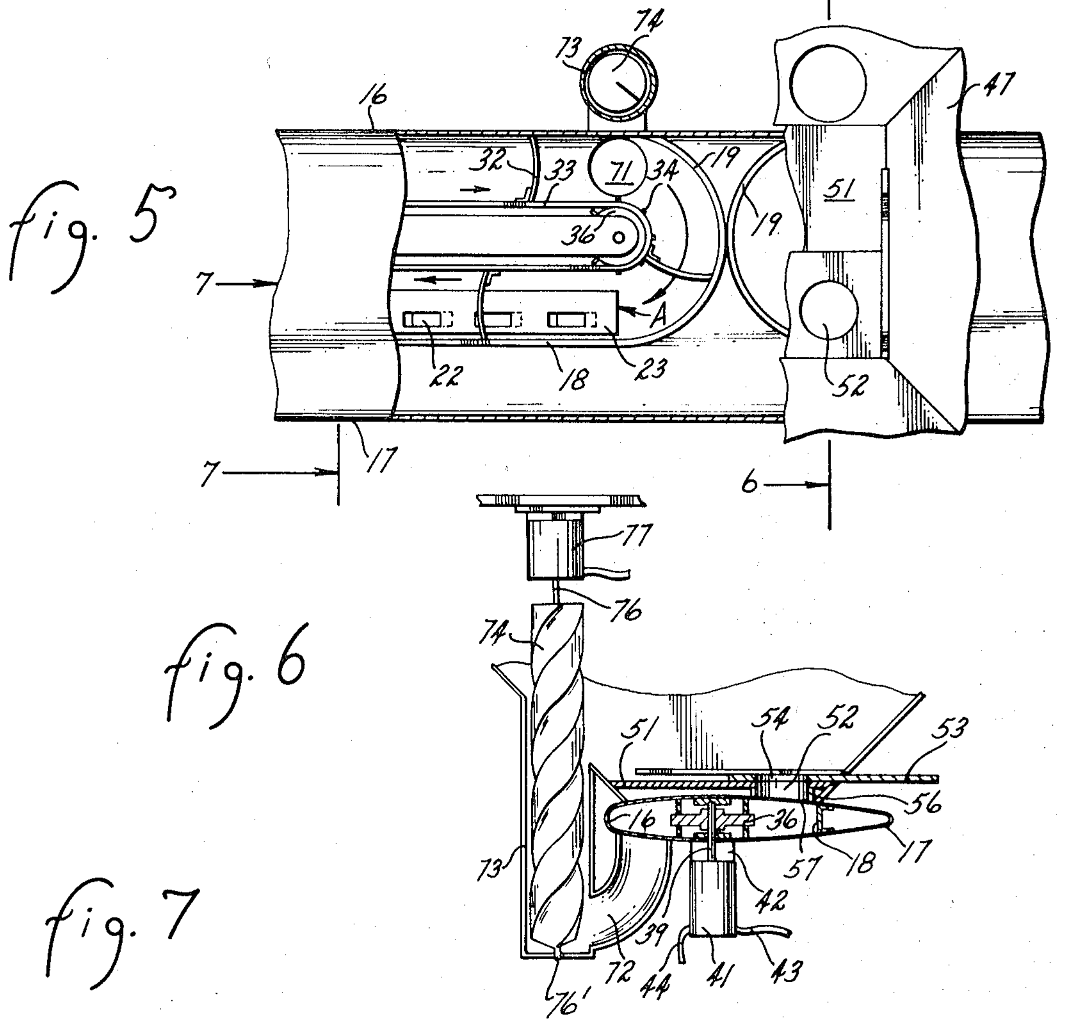
FIG. 5 is a similar plan view, but showing the center portion of the special airfoil, and a part of the hopper for the comminuted material broken away, with its bottom in plan view.
FIG. 6 is a fragmentary sectional view taken along the line 6–6 of FIG. 5.
Figure 7:
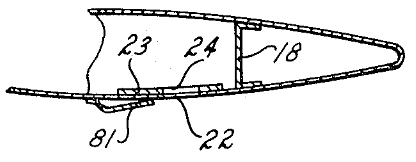
FIG. 7 is a fragmentary sectional view looking along the line 7–7 of FIG. 5.
Figure 10:
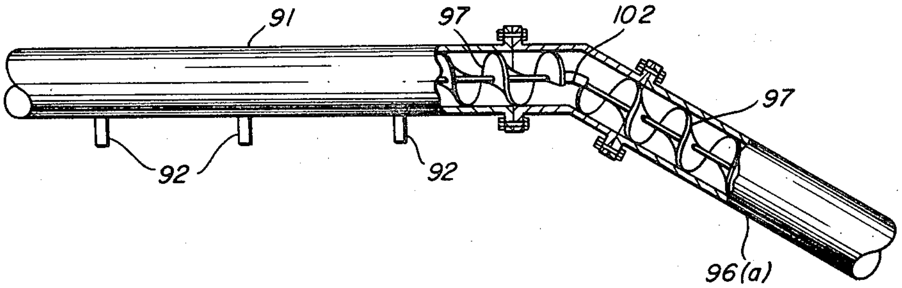
FIG. 10 is a cutaway sectional view of a portion of the distribution duct of the apparatus of FIG. 9.
Figure 9:
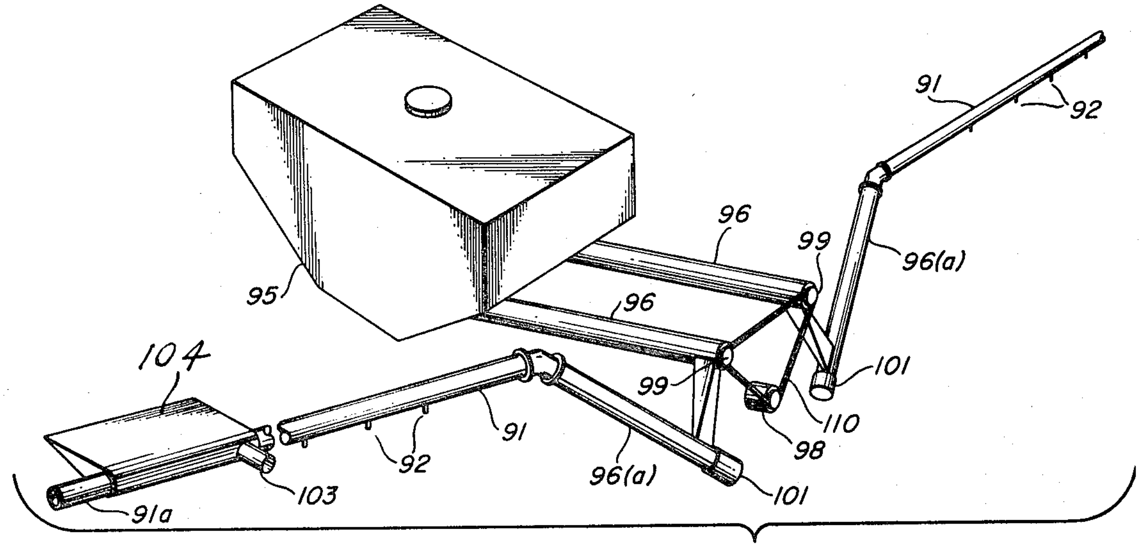
FIG. 9 is a perspective view of the distribution apparatus employed in the aircraft of FIG. 8.
Figure 8:
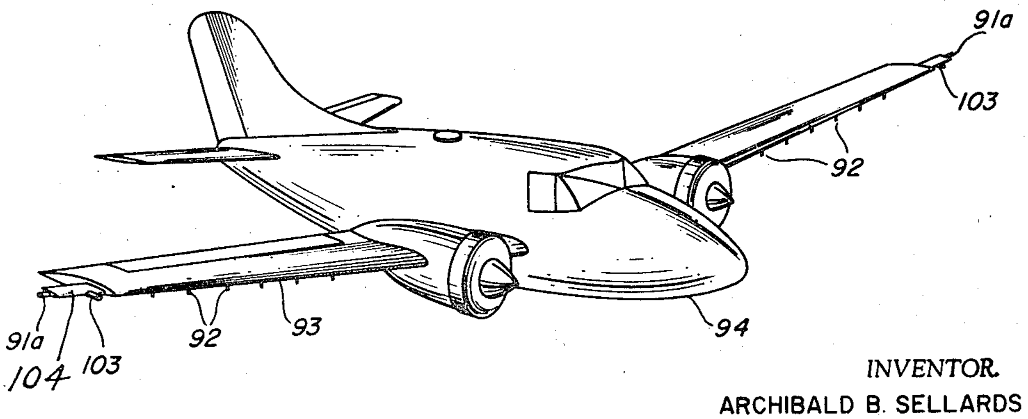
FIG. 8 is a perspective view of an aircraft incorporating another and presently preferred embodiment of the invention in which the lifting airfoil structure of the aircraft is utilized as the support for major portions of the distribution apparatus.

To distribute the particulate material, it is delivered from the hopper in an amount somewhat greater than will pass through openings provided in the bottom portion of the airfoils 13, moved longitudinally of the foils for distribution, the residue returned back to the center portion of the airplane, and such residue returned to the hopper and/or to the distribution mechanism for further delivery as required. A very satisfactory method of accomplishing this result is shown in the drawings. Each foil has a plurality of aligned openings 22, and a longitudinal plate 23 above such openings 22 provided with similar openings 24 is adjustable with respect to the foil so that the full opening 22 of the line of openings is available for the passage of the particulate material, or the effective size of the opening may be reduced by overlapping the openings 22 and 24 slightly as shown in FIG. 5, or finally, the openings 22 may be entirely closed by complete actuation of the longitudinal plate 23, if desired. Each of the longitudinal plates 23 is adjustable by means of a piston rod 26 actuated by a piston 27 within a hydraulic cylinder 28, to be controlled by a hydraulic fluid delivered through lines 29 and 31. Any suitable means for providing hydraulic fluid under pressure, such as any of the conventional hydraulic pumps, may be utilized, or for that matter the usual hydraulic system of the airplane may be utilized if desired. The invention is concerned only with the provision of suitable means, preferably hydraulic, for controlling the position of the longitudinal plate 23 and thereby the area of the openings through which the particulate material passes.

The particulate material is delivered by means which will be described to a position where it will be moved along across the face of the opening 22 by a series of paddles 32 carried by a belt 33 containing openings for receiving projections 34 from special sprocket wheels 36 and 37. Sprocket wheel 37 is carried on an idler shaft 38 but sprocket wheel 36 is carried on a shaft 39 driven by a hydraulic motor 41 carried on brackets 42, the hydraulic motor 41 being supplied with hydraulic fluid from a tube 43, and the spent fluid being returned through a tube 44 (see FIG. 6).

The hopper, indicated generally by the reference character 21, has sides 46 and 47, a front 48 and a back 49, at least the lower part of said sides, front and back sloping inwardly to a bottom 51 with a pair of openings 52, only one of which appears in FIGS. 5 and 6. The junction between the rounded portions 19 of the baffle 18 is the separation point between the two foils 13, and it should be recalled that the hopper extends over the entrance point for the particulate material on both foils as FIG. 1 clearly shows. Above the bottom 51 of the hopper and above the opening 52 is a closure plate 53 which also has two openings 54 (one being shown in the drawing) adapted to match with the two openings 52. The bottom 51 and the two openings 52 and 54 are slightly above the distribution airfoils 13, and a short section of pipe 56 delivers the particulate material from the hopper through an opening 57 in the top surface of the airfoil for delivery to an area indicated by the letter A in FIG. 5, which area is, of course, directly under the two openings 52 and 54. The plate 53 has a bracket 61 to which the end of a piston rod 67 is rotatably secured, the piston rod being controlled by a suitable piston (not shown) within a control cylinder 68 mounted on a bracket 69 as shown particularly in FIG. 3. The position of the parts in FIG. 3 corresponds to the position of the parts in FIGS. 5 and 6 where the particulate material in the hopper can drop continuously down to two positions corresponding to the point A in the two airfoils 13.

It should of course be understood that while the openings 52 and 54 will normally be aligned, they may be only partially aligned, so that the material dropped into the airfoils for distribution will be reduced. Normally, this is not necessary, because in the design of the equipment, enough particulate material is delivered to the airfoil so that even as it is moved longitudinally of the airfoils over each of the openings 22, there will always be more material than will fall through the openings, and the remainder or excess material will then be brought back to an opening 71 which is approximately directly opposite the openings 52 and 54 as seen in FIG. 6. The material dropping through openings 71 enters a curved delivery chute 72, suitably of circular cross section, communicating with the bottom of an upright return tube 73 (FIGS. 2, 3, 5 and 6) containing an elevator screw 74 in the form of an auger supported on shaft 76 and driven by a hydraulic motor 77, which hydraulic motor may be up within the body of the airplane. For stability, a bottom end 76' of the drive shaft 76 may engage a bearing surface in the bottom of the upright 73 to stabilize the position of the elevator screw 74 centrally of the upright 73. Thus, even though the hopper 21 may be substantially filled with particulate material, the auger will deliver excess material back into the body of the material in the hopper for redelivery back to the delivery airfoils 13.

Reference has already been made to the rounded portion 19 of the baffle 18. A similar curved portion 78 is provided near the outer end of each airfoil 13, so that as the particulate material is moved outwardly of the airfoil between the baffle 18 and the belt 33, it will be caused to turn backwardly on itself by the action of the paddles 32 and move between a contiguous portion of the belt 33 and the inner surface of the forward edge 16 of the foil 13. Looking at FIG. 6, it will be seen that the space available on both sides of the belt is approximately equal, and a relatively large amount of material to be sprayed can be moved continuously across the openings 22, and the excess returned to the hopper 21 as the airplane is in flight.

I have already pointed out that preferably airfoil 13 is shaped so as to have a minimum of drag and substantially no aerodynamic effect on the forward movement of the aircraft when it is in level flight. It will be noted, however, particularly by reference to FIG. 7, that the openings 22 are slightly behind the position of maximum thickness of the foil 13, so that there is a very slight rarefaction at the location of the openings 22, and the particulate material will be free to drop through the openings 22 assisted slightly by partial negative pressure, and being spread into individual particles as they enter the slipstream at the rear of the airfoil. To facilitate this action, however, without at the same creating the necessity of providing a special type of foil 13 which could have an undesirable effect on flight action at various attitudes of the plane, a plurality of special strip foils 81 are secured to the bottom of the distribution foils 13 just in advance of each of the openings 22, and confined in longitudinal dimension to the area occupied by such openings. These special strip foils 81 are designed to increase the negative pressure at the openings 22, and facilitate delivery of particulate material through such openings. It should be borne in mind that many types of materials, all of which are in the form of discrete particles such, for example, as seeds, will relatively simply fall through an opening such as 22 without the possibility of being packed up by partial compression such as can occur when hygroscopic materials or materials capable of becoming packed or caked, such as, without limiting the generality, sulfur, are being applied. In those instances, however, where there is any tendency whatsoever for the particulate material to ball up or pack, the strip foils 81 assure that there will be continuous delivery because of the negative pressure, or partial vacuum, created at these points.

For convenience of illustration, many of the parts utilized in the present invention are shown in the open without streamlining and without any marked attempt to cause the parts to contribute to the aerodynamic stability of the aircraft. While an aircraft installation exactly such as shown may be utilized with good results, to a considerable extent the parts are probably at least partially streamlined, and some of the parts which are shown out of the cabin may, in fact, be housed within the cabin of the aircraft. Furthermore, the aircraft shown is generally of the B17 configuration, without a showing of the retractable landing gear, but those skilled in the art will understand that other types of aircraft can be used, and that in modifying the airplane to include the features of the present invention, all of the usual parts of the airplane, including the retractable landing gears, should still operate in the conventional manner. It may be noted, however, that there are certain advantages in using a midwing airplane, or for that matter, even a high-wing airplane, because such aircraft construction definitely takes the airfoil away from too close proximity of ground level, and spaces far enough from the airfoil as to avoid any possible aerodynamic interference with the airfoil function.

The manner of using the aircraft assembly of the present invention should be apparent from the above description. Briefly, the hopper 21 will normally be filled with the material to be sprayed or distributed on the ground or into contact with vegetation, the plate 53 being adjusted to close the openings 52. Usually, the carrying capacity of the plane will be greatly in excess of that which will be stored in the hopper 21, and any suitable means may be employed for supporting additional material in the fuselage but outside the hopper. One method already mentioned is to carry the material to be distributed in the form of relatively large paper bags to be dumped manually into the hopper as it becomes partly emptied, or if desired, any of the usual available conveyor systems may be employed to transfer the sprayed material from storage hoppers to delivery hoppers. The present invention is not concerned with these types of operations, but makes available to the operator of the spray equipment the ability to carry very large amounts of the material to be sprayed so that spraying of very large fields or open areas is possible in one operation without returning to the ground. This is to be contrasted with conventional spray equipment in which a single hopper is filled on the ground, and the airplane must be returned to a small field for refilling whenever the hopper has become emptied. The present invention also avoids another very serious problem such as occurs in spraying certain types of material, in that the material may not feed uniformly from the hopper and will shift the center of weight of the airplane so badly as to sometimes cause serious accidents. In the present case, an assistant or assistants who may be copilots are available to inspect and supervise the movement of the material being sprayed continuously so that during the entire flight of the plane, once it has reached its operating destination, will be devoted to the spraying operation. Since delivery is made over a very wide path in a very uniform manner, the results obtained are unusually successful.

It is of course obvious that once the airplane is brought to the position where distribution is to be started, the hydraulic motor 68 will be activated, opening the hopper in two places at the bottom for delivery of the comminuted material to be sprayed to the two points A at the inner end of the two airfoils 13. At the same time, the motors 41 and 77 will be started to deliver the particulate material entirely across both foils 13 for delivery through the openings 22, and if the size of the openings 22 has not been properly set, then the hydraulic motor 28 will be actuated to move the strip 23 in either direction to control the openings 22 and deliver exactly the right amount of material as the airplane moves along. Excess material which does not fall through the openings 22 is, of course, eventually brought to the opening 71, and dropped down into contact with the elevator screws 74 for delivery back to the hopper 21.

The presently preferred embodiment of the invention is depicted in FIGS. 8—12, in which like reference numerals indicate the same elements. In this embodiment, the distribution ducts 91 have a plurality of distribution openings 92 therein. The distribution openings 92 extend through the leading edge 93 of the wing of the aircraft 94. The particulate material is stored and transported to the distribution site in a hopper 95 located at substantially the center of gravity of the aircraft 94. The particulate material is transported from the bottom of the hopper 95 through the transfer ducts 96 and 96*a*. The particulate material is moved through the duct system by means of a positive displacement auger 97 operating within the ducts. The augers within the transfer ducts 96 are powered by an electric or hydraulic motor 98 coupled to pulleys 99 affixed to the ends of the augers by means of a belt drive 100. The augers within the transfer ducts 96*a* and distribution ducts 91 are powered by electric or hydraulic motors 101, the augers being coupled at the joint between the transfer duct 96*a* and the distribution duct 91 by means of a flexible connector 102 which can be of the familiar "universal joint" type or can be constructed of rubber or other elastomeric material in the manner of the familiar "metalastic" coupling. Excess particulate material which has not been discharged from the distribution ducts 91 is removed from the duct system by expelling the material through the open end 91*a* of the duct 91. To facilitate the removal of this excess material, a pitot tube 103 is provided which, because of the ram effect, forces air outwardly through the open end 91*a* of the distribution duct 91. An airfoil 104 encompasses a sufficient portion of the distribution duct 91 extending beyond the wing tip to ensure no adverse effect on the flight characteristics of the aircraft.

Since the particulate material is removed from the hopper 95 and transferred through the duct system to the distribution openings 92 by means of a positive displacement auger 97, and since the speed of rotation of the augers may be accurately controlled by adjusting the speed of the drive motors 98 and 101, it is possible to very accurately control the rate of distribution of the particulate material and this distribution rate can be maintained without depending on maintaining a constant airspeed, since no part of the system is powered by propellers, venturis or other contrivances which are dependent on the airspeed of the aircraft to regulate their capacity. Similarly, in the embodiment of FIGS. 1—7, the speed of the positive displacement pedal conveyor can be accurately controlled by adjusting the rotational speed of the motor 41, and additional control of the distribution rate, independent of the speed of the aircraft, is provided by means of the slide 23 to adjust the size of the distribution openings 22.

A relatively simplified functional embodiment of the invention has been shown and described in detail so that those skilled in the art may understand the manner of practicing the invention.

I claim:

1. Apparatus for aerially applying particulate materials to the earth, comprising, in combination:

a. an aircraft having a load-carrying fuselage;
b. a particulate material hopper carried by said fuselage;
c. distribution ducts extending laterally of said fuselage and having a plurality of distribution openings therein;
d. transfer duct means connecting said hopper and said distribution ducts;
e. positive displacement particulate material delivery means having a capacity independent of the airspeed of said aircraft operatively disposed within said transfer duct means and distribution ducts;
f. rate-of-distribution means for selectively controlling the rate at which particulate materials pass through said material delivery means; and
g. ejection means for removing from the outboard ends of said distribution ducts remnant particulate material which is not discharged through said distribution openings, each of said ejection means including a pitot tube communicating with one of said distribution ducts outboard of said plurality of distribution openings for urging remnant particulate material outwardly for ejection, each of said ejection means further including an airfoil encompassing a sufficient length of the outboard end of one of said distribution ducts to mitigate adverse effects on the flight characteristics of said aircraft.

2. Apparatus for aerially applying particulate materials to the earth comprising, in combination:

a. a fixed-wing aircraft having a load-carrying fuselage, and laterally extending lifting airfoils;
b. a particulate material storage hopper carried by said fuselage and located substantially at the center of gravity of said aircraft;
c. distribution ducts extending longitudinally of said lifting airfoils and having a plurality of distribution openings therein;
d. transfer duct means connecting said hopper and said distribution ducts;
e. positive displacement particulate material delivery augers having a capacity independent of the airspeed of said aircraft operatively disposed within said transfer duct means and distribution ducts;
f. rate-of-distribution means for selectively controlling the rate at which particulate materials pass through said material delivery augers; and
g. ejection means for removing from the outboard ends of said distribution ducts remnant particulate material which is not discharged through said distribution openings, each of said ejection means extending beyond the wing tip of said aircraft and including a pitot tube communicating with one of said distribution ducts outboard of said plurality of distribution openings for urging remnant particulate material outwardly for ejection, each of said ejection means further including an airfoil encompassing a sufficient length of the outboard end of one of said distribution ducts to mitigate adverse effects on the flight characteristics of said aircraft.